Patented Apr. 26, 1938

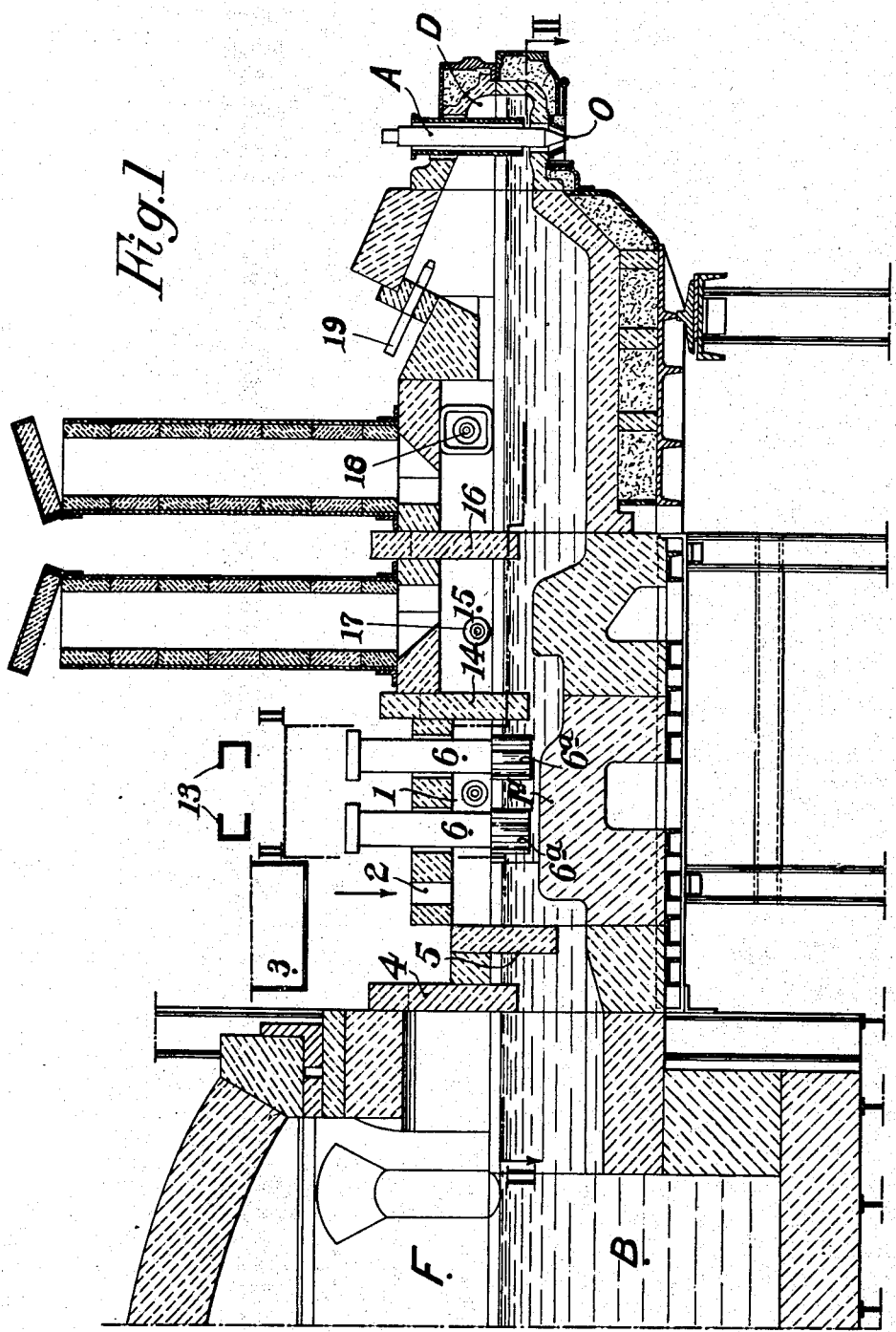

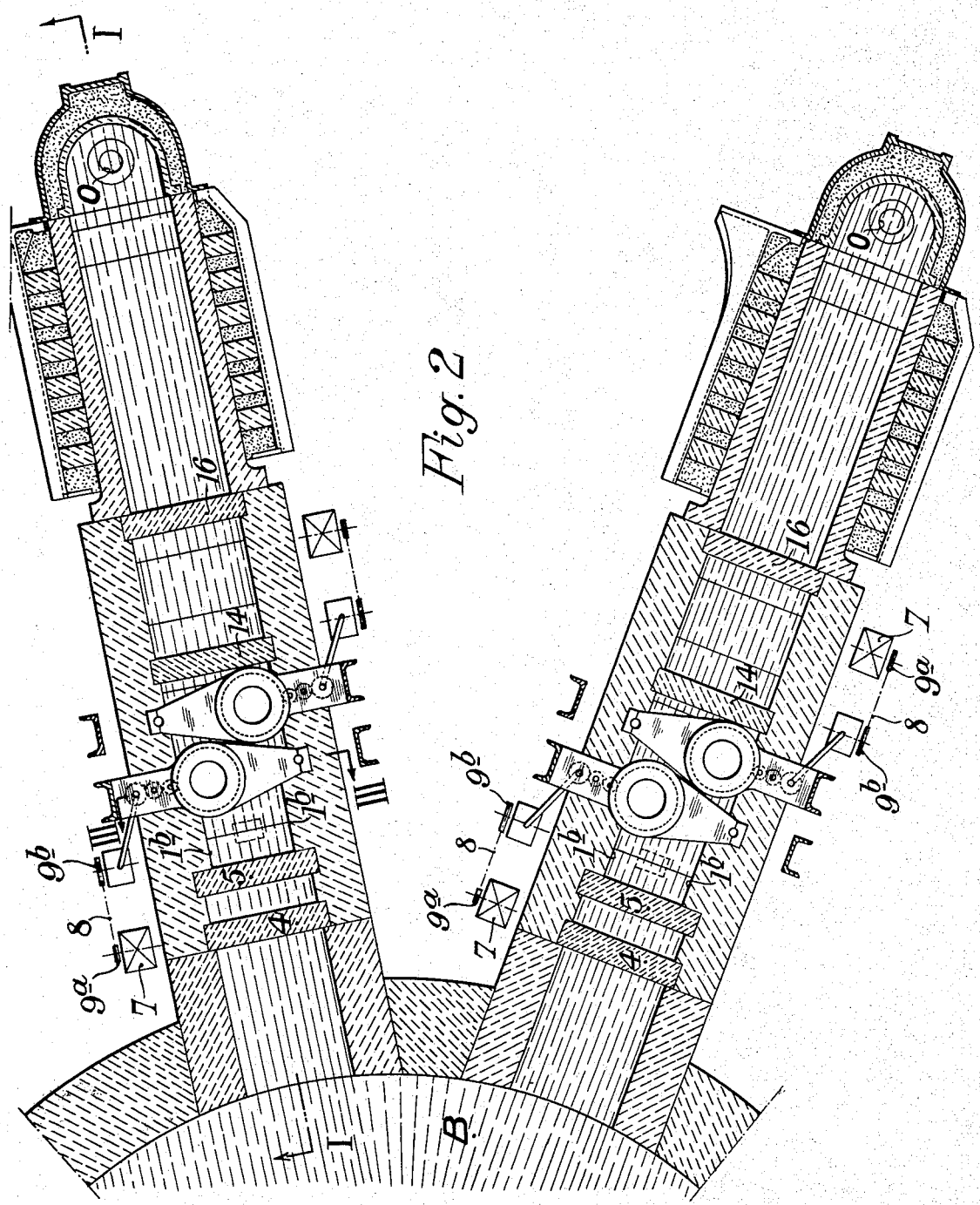

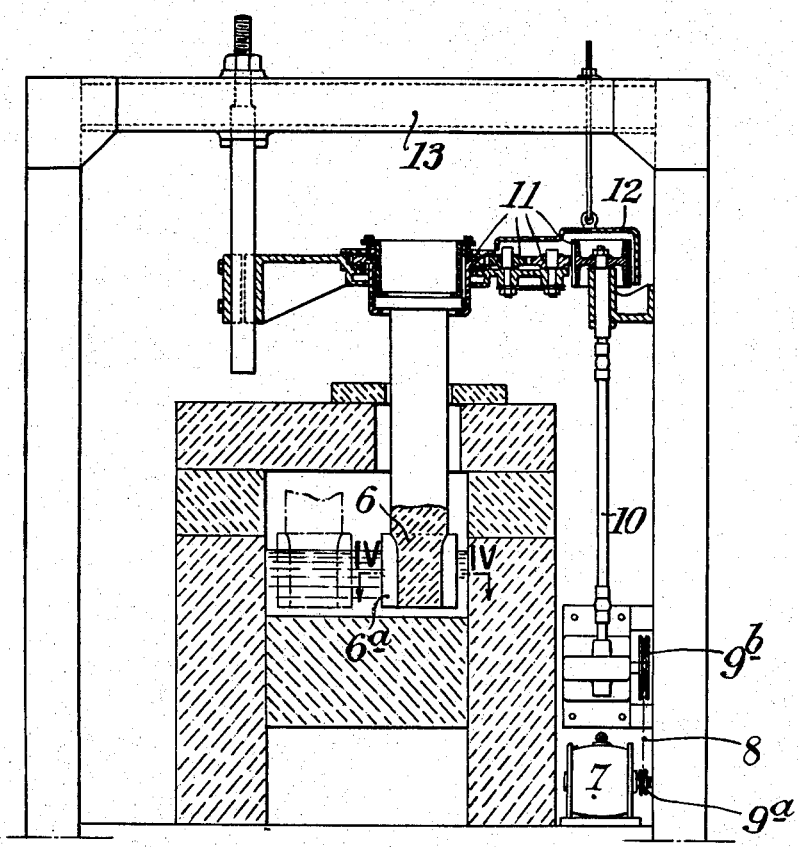

2,115,408

UNITED STATES PATENT OFFICE 2,115,408

APPARATUS FOR THE MANUFACTURE OF COLORED GLASS

Pierre Brossé, Paris, France, assignor to Société Anonyme Holbrever, Paris, France Application June 19, 1934, Serial No. 731,282
In France June 3, 1934

4 Claims. (Cl. 49—55)

This invention relates to a process allowing a continuous production of molten colored glass, and particularly applicable to the automatic manufacture of glass in tank furnaces.

It is a further object of my invention to provide a device for carrying this said process into practice.

The process according to my said invention consists in causing a batch of molten glass prepared in a furnace to flow through one or more distributing ducts, adding the coloring matter to the glass between the furnace and the outlet orifice of each distributing duct which is to give a colored glass, and in rendering the mixture of coloring matter and glass homogeneous between the place where the coloring matter is introduced and the orifice of the distributing duct, these operations of adding the coloring matter and rendering the mixture homogeneous being affected in a continuous manner whilst the glass flows in the distributing duct.

I am aware that a homogeneous mixture has already been obtained at the outlet of one or more furnaces, by a discontinuous process which essentially consists in intermittently pouring the constituents of the mixture into a vessel from which this mixture is also intermittently removed.

I am also aware of continuous processes for rendering a glass homogeneous or purifying it, or still for preparing striated glass as it flows out of a furnace.

But, I do not know and do not believe that processes for the continuous preparation of homogeneously colored glass by adding a coloring matter to a stream of glass flowing out of a furnace and subsequently rendering the mixture homogeneous in an equally continuous way have ever been known or used before my said invention.

This process has numerous and important advantages over those usually employed, which latter generally consist in adding the coloring matter to the batch of white glass into the tank:

In the first place, it allows, whatever the capacity of production of the plant may be, of producing a glass of a given color by quantities as small as desired by continuous operations, and of rapidly passing from one color to another, whereas the above mentioned ordinary processes necessitate the production of each kind of colored glass by quantities equal to the charge contained in the tank and, consequently, on the one hand, important stocks are thus constituted which remain unused for a long time and, on the other hand, considerable time is often lost for passing from one production to another.

It is even possible, by means of the process according to the invention, with a tank supplying a plurality of feeders, of simultaneously producing glasses of different colors by continuous operations, and also, if need be, white glass, by means of each of these said feeders respectively.

My process further allows, even for productions of glasses of different kinds by small quantities of utilizing a single tank of large capacity and, consequently, of preserving the advantage of a very low cost price over plants in which use is made, according to the ordinary processes, of separate tanks of small capacity for the production of different glasses by small quantities. According to my invention, use is made, for all productions, of a single batch of white glass, this allowing to prepare said batch in better conditions than small separate batches, and avoids the variations which are always possible from one batch to another. My process also preserves all the advantages of a continuous operation in all cases.

Finally, as the tank always contains only a single batch of white glass, this allows of avoiding the inconveniences—particularly the loss of glass—which, of usual, always occur at the time the composition is modified, owing to the fact that the residue of the preceding batch soils the fresh one.

In a plant for carrying my said process into practice, there is provided between the tank and the feeder or each of the feeders a device through which the glass is distributed, this said device ensuring first the incorporation of the coloring matter into the white glass, (this said matter being preferably used in the form of a glass containing a large proportion of coloring matter), and then the production of a homogeneous mixture of these elements.

Other features and advantages of the invention will appear from the description given hereinafter, with reference to the accompanying drawings which illustrate an example of a plant for carrying this process into practice Fig. 1 is a vertical longitudinal section made according to line I—I of Fig. 2.

Fig. 2 is a horizontal section made according to line II—II of Fig. 1.

Fig. 3 is a cross section made according to line III—III of Fig. 2.

Fig. 4 is a section of a mixing stirrer and is made according to line IV—IV of Fig. 3.

This plant comprises a furnace F in which a batch of molten white glass B is prepared.

The distribution of the glass is effected through one or more feeders D, of any suitable type, having, for instance, an outlet orifice O through which the flow of glass is controlled by means of a needle A.

According to my invention, between the furnace and the feeder there is interposed a device allowing to mix with the white glass the coloring matter giving the desired tint to the glass when it issues from the feeder.

For that purpose, the conduit connecting the furnace to the feeder is appreciably longer than in ordinary plants, and comprises a zone 1 in which an orifice 2 is provided for the introduction of the coloring matter supplied, for instance, from a tank 3.

This coloring matter preferably consists in a mixture of molten glass which serves as a carrier and of a large proportion of the coloring matter proper.

On the up side of the zone 1, the glass outlet conduit is provided with dampers 4, 5, adapted, on the one hand, to compel the batch of white glass B to flow in this conduit through its lower part, and, on the other hand, by reducing the cross section of the passageway, to proportionally increase the speed of flow, particularly under the damper 5.

Owing to this latter feature, the coloring matter is prevented from spreading upstream in the white glass, that is to say into the batch B which it would soil, so that this batch B can also be used for the manufacture of glass of other tints, either by introducing another coloring matter in the same device after the manufacture in progress has been terminated, or, at any moment, through other feeders supplied by the furnace through the medium of similar devices. Fig. 2, for instance shows two feeders each of which is provided with a device for the introduction of the coloring matter, so that both feeders are capable of respectively producing two different glasses at the same time. The machine might of course be provided with any suitable number of such feeders.

For the same purpose, the coloring matter is caused to flow downstream, with the glass to be colored, at a relatively high speed. Consequently, the portion of the conduit in which the white glass receives this coloring matter is given a relatively small cross section, for instance by forming portions 1a, 1b of a greater thickness on its bottom and its side walls.

In this zone 1 of the device, the glass is raised, for instance by a burner, to a temperature at which it is sufficiently fluid in order that the mixing can suitably take place.

The mixture is also stirred by means of rotary stirrers 6 provided with ribs 6a rotating in reverse directions, arranged in a winding path, and in such a manner that narrow passages only are left between them and between each of them and the walls of conduit 1; thus, the stirring is efficiently exerted throughout the mass of glass.

In the example under consideration, each of the stirrers 6 is actuated by a motor 7, through the medium of a transmission ensuring a suitable gearing down ratio. This transmission is effected through a chain 8 and toothed wheels 9a, 9b, a Cardan shaft 10, and pinions 11. The stirrer, the transmission and a casing 12 enclosing the pinions 11 are mounted on a portal 13.

On the downstream side of the zone 1 in which the mixing of white glass and coloring matter and the stirring of this mixture, are effected, as above stated, a damper 14 is so arranged as to compel the mixture to flow at a suitable speed, for avoiding the too rapid flowing downstream of the coloring matter, on the one hand, and, on the other hand, to cause this flow to take place only at the lower portion of the mixture. This latter particularly prevents the upper portion of the glass, which is the first to receive the coloring matter, from immediately flowing away with this coloring matter, which would give a "double" glass, the upper portion of which would be colored alone, or would at least be more intensely colored than the lower portion.

On the downstream side of damper 14, the device comprises a zone 15 in which the mixture becomes homogeneous, this homogeneity being facilitated by heating to a suitable temperature, for instance by means of a burner.

Finally, on the downstream side of the zone 15, the colored glass passes into the feeder under a damper 16 which, as the preceding ones, compels it to flow at its lower part only, whereupon it is discharged to the exterior, as usual, through the orifice O.

Of course, use might be made, on the downstream side of the zone 15 of the device according to the invention, of any suitable distributing system other than the feeder D indicated solely by way of example.

Data will be given, by way of example, concerning a production which has been carried out in a furnace of the above described type; it is moreover to be understood that none of these data are to be considered as limitative, and that it will be possible, without departing from the scope of my invention, to make therein any modifications suited to particular conditions, nature of the glass to be manufactured, characteristic features of the plant employed, etc.

The example under consideration concerns the manufacture of lavender blue glass colored by means of cobalt oxide in the proportion of 1,6 gr. of this oxide per 100 kgs. of glass.

The machine operates at a rate of 32,5 strokes per minute, and the article manufactured weighs 195 grs.

The coloring matter employed is supersaturated glass, containing a proportion of cobalt oxide 40 times greater than that indicated above, and this coloring mixture is fed to the machine at a rate of 160 grams per minute.

The speed of the white glass upon entering the device is of 1,45 cm/min., and by passing under damper 5, this speed is increased to 5,50 cm/min. In the portion of zone 1, the cross section of which is reduced by the thicker portions 1a, 1b, the speed is of 5,30 cm/min., and, on the downstream side, at the place where the mixture is stirred by the stirrers, it is reduced to 3,90 cm/min. and keeps this value in zone 15.

The speed of rotation of the stirrers 6 is of the order of 10 revolutions per minute.

On the downstream side of damper 16, the speed is reduced to 1,90 cm/min., and, upon delivery, that is to say in the front bowl of the feeder, it is of 6,70 cm/min.

Finally, the mixture is rendered homogeneous by heating it, by means of burners, to a temperature of the order of 1.400° C. in the zones 1 and 15 of the device. The burners may be of any known type, and similar to 17, 18, and 19, for example.

I claim:

1. A device for the continuous manufacture of molten homogeneous colored glass from a batch of molten glass, comprising a tank wherein such batch is melted, delivery means spaced from said tank and distributing such homogeneous colored glass, a covered duct leading a stream of this molten glass from said tank to said delivery means and the combination of means for adding coloring matter to the upper surface of the glass stream at a predetermined point in said duct, with means for stirring the glass stream flowing in said duct, means for heating said glass stream, said duct having different cross sections at different points along its length so as to vary the stream section of the mixture of glass and coloring matter in the duct between the predetermined point at which the coloring matter is added to the glass and said delivery means.

2. A device for the continuous manufacture of molten homogeneous colored glass from a batch of molten glass, comprising the combination, with a tank wherein such batch is melted, delivery means spaced from said tank and distributing such homogeneous colored glass, and a duct leading a stream of this molten glass from said tank to said delivery means, of means for adding a coloring matter to the upper surface of the glass stream at a predetermined point in said duct, the duct having a shallow portion at one point along its length decreasing the depth of the glass stream at the predetermined point where the coloring matter is added to said stream, and means for stirring and heating the mixture of glass and coloring matter between said predetermined point where the coloring matter is added to the glass and the said delivery means.

3. A device for the continuous manufacture of molten homogeneous colored glass from a batch of molten glass, comprising the combination, with a tank wherein such batch is melted and delivery means spaced from said tank and distributing such homogeneous colored glass, and a duct leading a stream of this molten glass from said tank to said delivery means, means for adding a coloring matter to the upper surface of the glass stream at a predetermined point in said duct, a plurality of dampers spaced apart in said duct and at least one being located upon the downstream side of said predetermined point, spaced projections also arranged in the downstream side of said point within the duct, in spaced relation to said dampers, and rotary stirrers arranged in staggered relation in the path of the glass stream on the downstream side of at least one of said dampers, and means for heating the mixture of glass and coloring matter between the predetermined point where the coloring matter is added to the glass stream and the said delivery means.

4. A device for the continuous manufacture of molten homogeneous colored glasses comprising a container for holding a single batch of molten glass, a plurality of ducts extending radially from said batch and each leading off a stream of the molten glass, delivery means at the outer end of each duct capable of distributing the streams of glass in the form of homogeneous different colored glasses, means in each duct for adding coloring matter at a predetermined point to the upper surface of the glass stream, means beyond said point in each duct for stirring and means for simultaneously heating the glass, the duct having different cross sections at different points along its length so as to vary the stream section of the mixture of glass and coloring matter between the predetermined point at which the coloring matter is added to the glass and the delivery means.

PIERRE BROSSÉ.